(12) United States Patent
Kawaguchi

(10) Patent No.: US 10,021,944 B2
(45) Date of Patent: Jul. 17, 2018

(54) CORD LOCK

(71) Applicant: NIFCO INC., Yokosuka-shi, Kanagawa (JP)

(72) Inventor: Gaku Kawaguchi, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 39 days.

(21) Appl. No.: 15/112,295

(22) PCT Filed: Feb. 6, 2015

(86) PCT No.: PCT/JP2015/053382
§ 371 (c)(1),
(2) Date: Jul. 18, 2016

(87) PCT Pub. No.: WO2016/125302
PCT Pub. Date: Aug. 11, 2016

(65) Prior Publication Data
US 2016/0366988 A1 Dec. 22, 2016

(51) Int. Cl.
*A44B 11/16* (2006.01)
*F16G 11/00* (2006.01)
*F16B 2/12* (2006.01)
*A44B 13/00* (2006.01)
*A43C 7/00* (2006.01)

(52) U.S. Cl.
CPC ............... *A44B 11/16* (2013.01); *A43C 7/00* (2013.01); *A44B 13/007* (2013.01); *A44B 13/0094* (2013.01); *F16B 2/12* (2013.01); *F16G 11/00* (2013.01); *Y10T 24/3984* (2015.01)

(58) Field of Classification Search
CPC ..... A44B 11/02; A44B 11/16; Y10T 24/3984; F16G 11/10; F16G 11/03; F16B 2/12; A43C 7/00
See application file for complete search history.

(56) References Cited

U.S. PATENT DOCUMENTS

2012/0159752 A1 6/2012 Kawaguchi
2013/0104346 A1 5/2013 Kawaguchi

FOREIGN PATENT DOCUMENTS

| JP | H07-000971 U | 1/1995 |
|----|--------------|--------|
| JP | 2009-183447 A | 8/2009 |
| JP | 2011-019622 A | 2/2011 |
| JP | 2011-251008 A | 12/2011 |

*Primary Examiner* — Abigail E Troy
(74) *Attorney, Agent, or Firm* — Manabu Kanesaka

(57) ABSTRACT

A cord lock includes a female member including first cord insertion portions through which a cord can be inserted to pass; a male member capable of moving in and out from an opening of the female member, and including second cord insertion portions through which the cord inserted to pass through the first cord insertion portions can pass; and an urging device provided between the female member and the male member to provide an urging force in a direction wherein the male member protrudes from the opening of the female member. The second cord insertion portion of the male member and the urging device are located adjacent to each other, and on opposed faces of the female member and the male member along an insertion direction of the cord, straight portions which can carry out at least a line contact are provided.

5 Claims, 16 Drawing Sheets

CORD LOCK

FIELD OF TECHNOLOGY

The present invention relates to a cord lock, and can improve an operability of a male member.

BACKGROUND ART

Conventionally, there is known a cord insertion tool wherein two cord insertion holes are respectively provided on both sides of a main member and an operation member, and an elastic member such as a compression spring or the like is provided between the two cord insertion holes (see [0011] to [0013] and FIG. 4 of Patent Document 1).

PRIOR ART DOCUMENT

Patent Document

Patent Document 1: Japanese Utility Model Examined Publication No. H07-000971

SUMMARY OF THE INVENTION

Problems to be Solved by the Invention

In the aforementioned conventional cord insertion tool, however, since positions of the two cord insertion holes and a position of the elastic member differ, there is an advantage that a thickness in an operation direction of the operation member can be comparatively thin. However, in the conventional cord insertion tool, if the number of cord insertion holes is reduced to one, the operation member easily inclines in the operation direction thereof so as to have a problem that an operability of the operation member deteriorates.

Therefore, the present invention is made in view of the problem that the aforementioned conventional technology has, and an object of the present invention is to improve the operability of the male member regardless of a pressing position of the male member.

Means for Solving the Problems

The present invention is made in order to obtain the aforementioned object, and the present invention has the following characteristics.

First, a cord lock comprises the following structures.

(1) Female Member

A female member includes first cord insertion portions through which a cord can be inserted to pass, and has a cylindrical shape including an opening at least at one end.

The "cord" includes a round cord, a flat cord, a tape, a band, a cord, and the like.

Also, the "first cord insertion portion" includes a hole and a slit.

(2) Male Member

A male member is supported to be capable of moving in and out from the opening of the female member, and includes second cord insertion portions, communicating with the first cord insertion portion, through which the cord inserted to pass through the first cord insertion portion can be inserted to pass.

The "second cord insertion portion" includes the hole and the slit.

(3) Urging Device (For Example, a Coil Spring)

An urging device (for example, a coil spring) is provided between the female member and the male member, and provides an urging force in a direction wherein the male member protrudes from the opening of the female member.

Secondly, the second cord insertion portions of the male member and the urging device (for example, the coil spring) are located adjacent to each other.

Thirdly, on opposed faces of the female member and the male member along an insertion direction of the cord inserted to pass through the first cord insertion portions of the female member, there are provided straight portions which can carry out at least a line contact.

In a preferred aspect of the present invention, on a bottom portion facing the opening of the female member, there is provided a through portion through which at least one portion of a peripheral wall of the male member can pass. According to the preferred aspect, when the male member is pushed in, an overlapping portion with the female member can be provided, thereby obtaining a thickness reduction in a pushing direction of the male member.

In another preferred aspect of the present invention, between the second cord insertion portions of the male member and the urging device (for example, the coil spring), there is provided a partition wall. According to the preferred aspect, the partition wall functions as a guide when passing the cord through so as to improve inserting ability of the cord.

Preferably, the cord lock according to the present invention comprises the following characteristics First, the urging device is the coil spring. Secondly, in the partition wall, an area which overlaps the coil spring is partially cut out.

According to the preferred aspect, a length in a width direction partitioned by the partition wall can be shortened so as to obtain miniaturization.

Furthermore, in another preferred aspect of the present invention, in the female member, there is provided a hole portion through which a belt-like material such as the band or the like can be inserted to pass. According to the preferred aspect, the cord lock can be attached to pouches, clothes, or the like by the belt-like material such as the band or the like inserted to pass through the hole portion.

Effect of the Invention

According to the present invention, regardless of a pressing position of the male member, an operability of the male member can be improved.

Also, according to the present invention, a layout of the urging device is changed from a lower side to a horizontal side of the cord insertion portion so as to prevent a cord insertion tool from inclining, i.e. "falling down" between fingers holding the cord insertion tool when the cord is released. Additionally, according to the present invention, the aforementioned straight portions are provided so as to design an outer face of the female member based on the straight portions so as to provide the outer face having a guide function for fingers, and reduce, i.e. "falling-down" when the cord is released.

On the other hand, according to the present invention, due to the change of the layout of the urging device, an operation area of the male member can be enlarged so as to prevent fingers from having discomfort because the operation area is small when the cord is released. Also, according to the present invention, due to the change of the layout of the urging device, a thickness reduction in an operation direction of the male member can be obtained.

BRIEF DESCRIPTION OF THE DRAWINGS

FIG. 13 is a perspective view of the cord lock wherein a cord is inserted to pass through.

BEST MODES OF CARRYING OUT THE INVENTION

Hereinafter, the first embodiment of a cord lock according to the present invention will be described in detail.

(Cord Lock 10)

Figure 1:
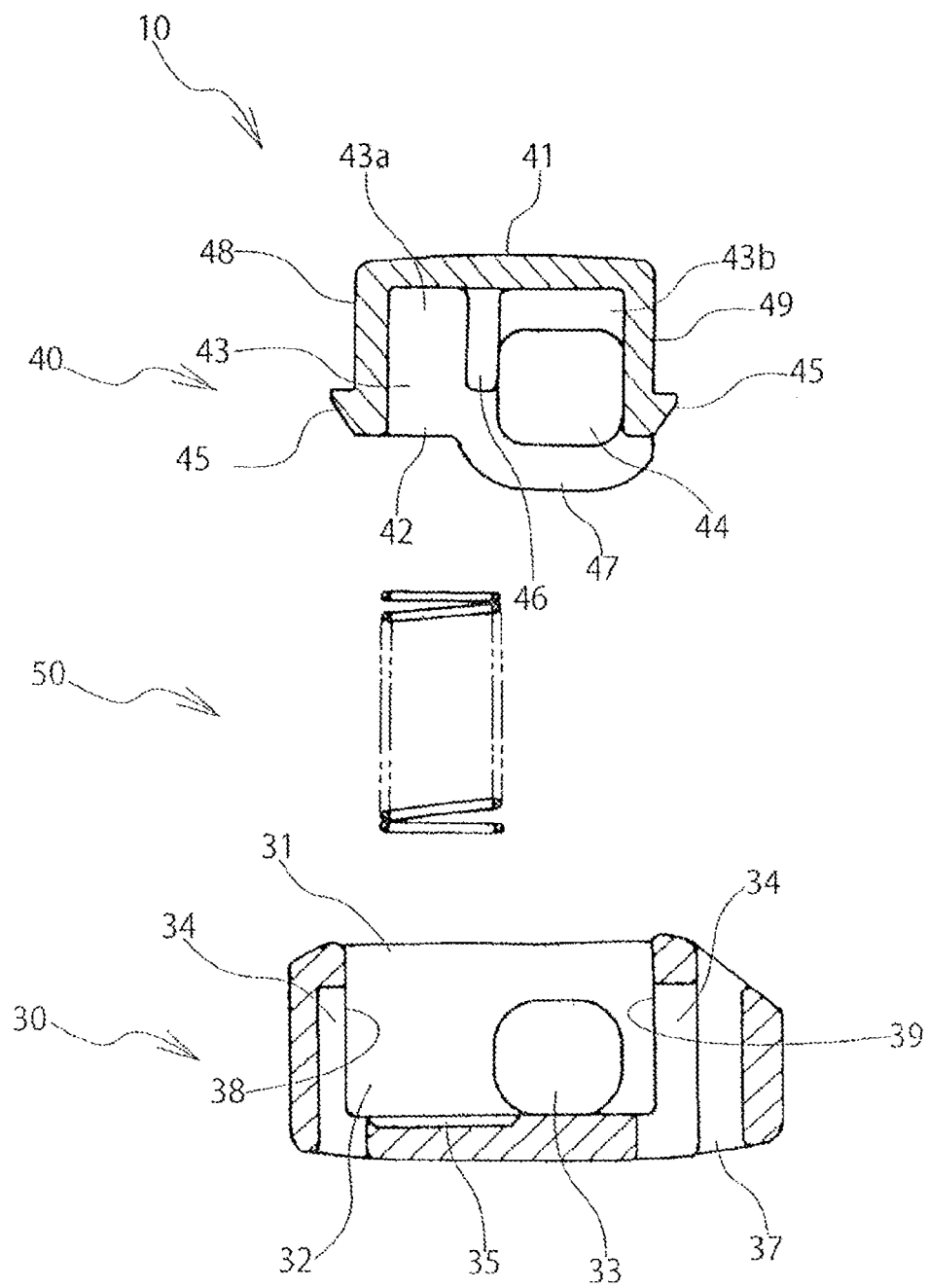
FIG. 1 is an exploded cross-sectional view of a cord lock according to the first embodiment of the present invention.

In FIG. 1, the reference numeral 10 represents the cord lock, and the cord lock 10 penetrates a cord 20 passing through a hood, a hemline, or the like of clothes or the like such as a jacket with a hood or the like to be used for adjusting a length of the cord 20.

The cord 20 includes a round cord, a flat cord, a tape, a band, a cord, and the like.

Incidentally, the cord lock 10 is used for the cord 20 of the clothes or the like; however, the cord lock 10 is not limited to the above, and may be used for a bag, a backpack, a pouch, shoes, a harness, or the like.

As shown in FIG. 1, the cord lock 10 is formed broadly by the following parts.

Incidentally, the following (1) to (3) will be described later.

(1) Female Member 30
(2) Male Member 40
(3) Coil Spring 50 (Urging Device)

Incidentally, the parts of the cord lock 10 are not limited to the aforementioned (1) to (3), and may include a belt-like material (not shown in the drawings) such as the band or the like inserted into the later-described hole portion 37 of the female member 30 as well.

(Female Member 30)

Figure 13:
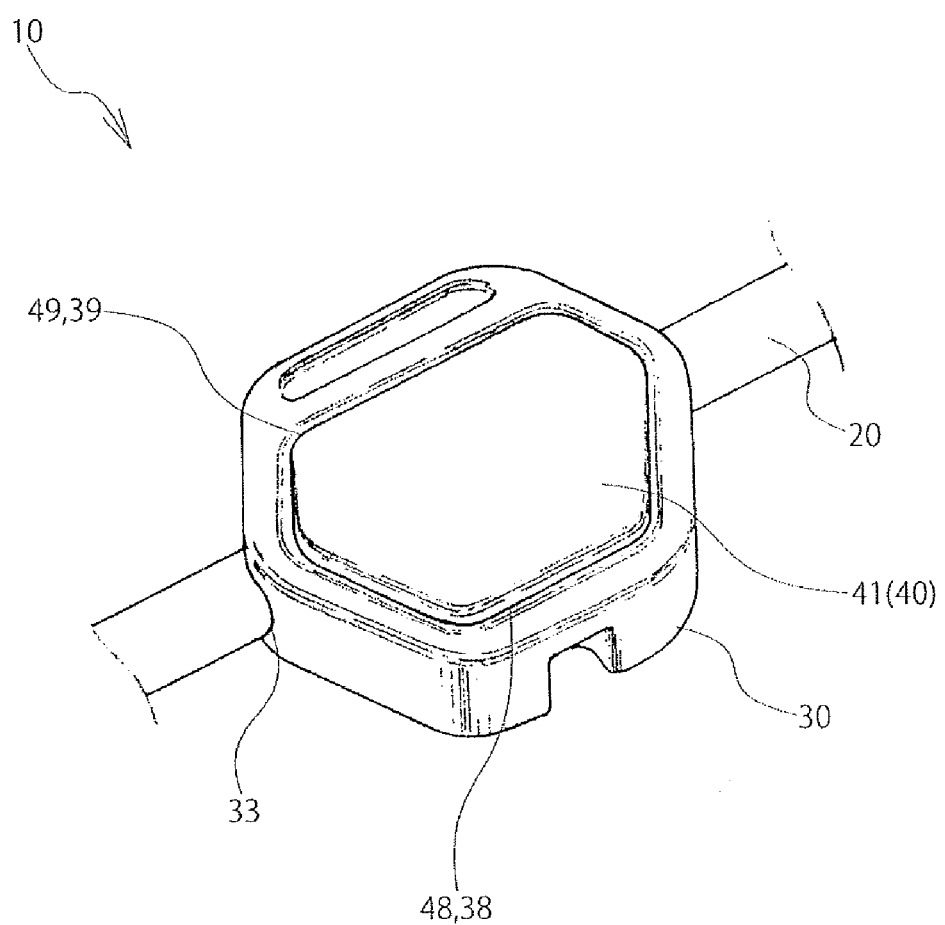
Figure 14:
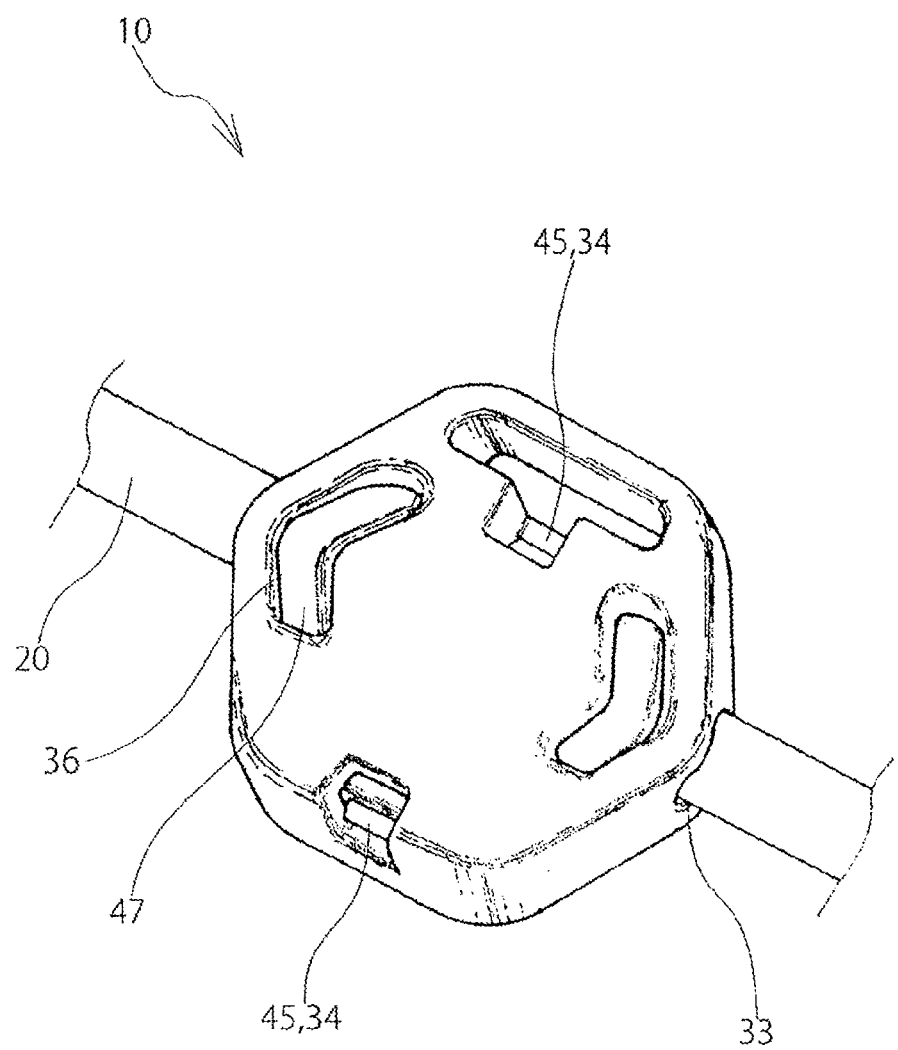
FIG. 14 is a perspective view wherein the cord lock is viewed from a bottom face side corresponding to FIG. 13.

As shown in FIG. 1, FIG. 13, and FIG. 14, the female member 30 includes first cord insertion portions 33 through which the cord 20 can be inserted to pass, and has a cylindrical or hollow shape including an opening 31 at least on one side.

The female member 30 is integrally formed by thermoplastic resin having appropriate rigidity, for example, POM (polyacetal or polyoxymethylene).

Incidentally, as for a material of the female member 30, the POM has been shown as an example; however, it is not limited to the above, and another resin material may be used, or the female member 30 may be made of metal.

Figure 2:
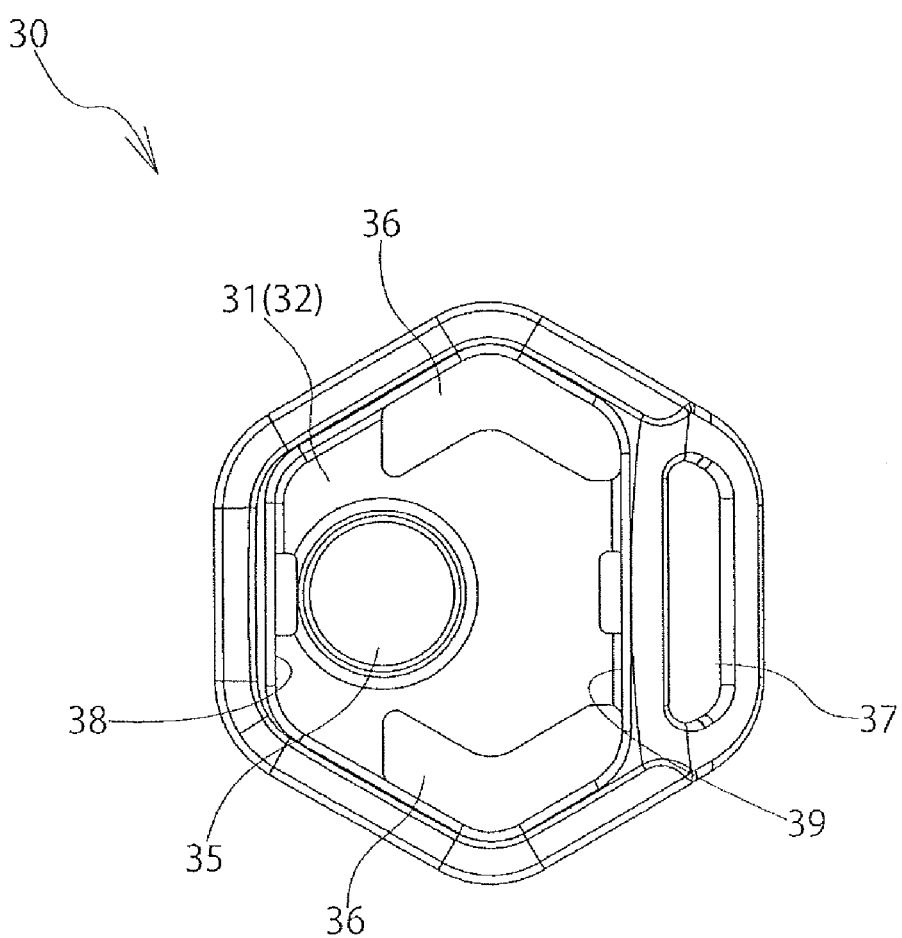
FIG. 2 is a plan view of a female member according to the aforementioned embodiment.
Figure 3:
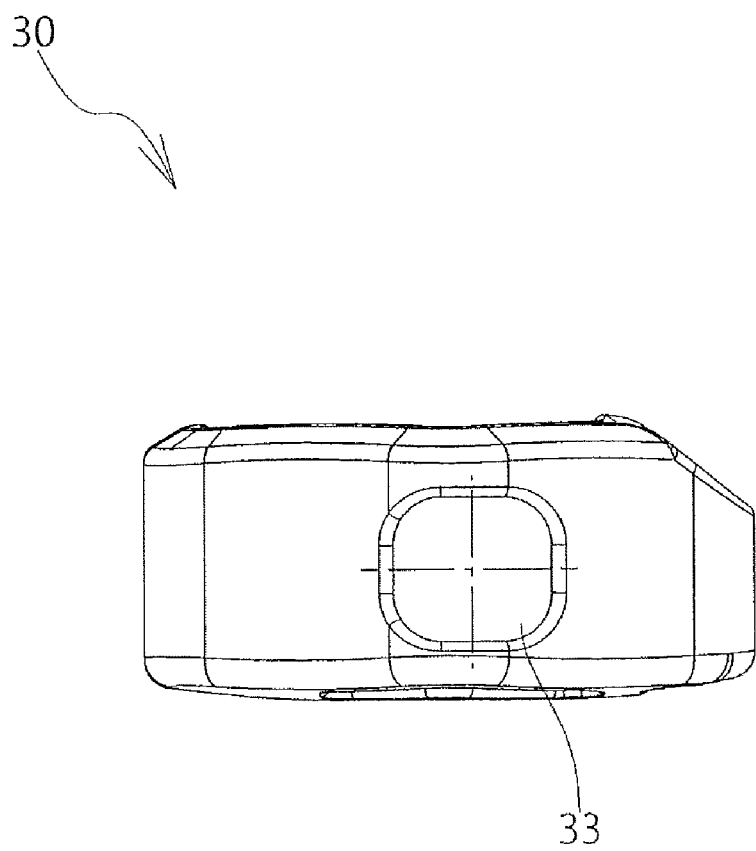
FIG. 3 is a front view of the female member.
Figure 4:
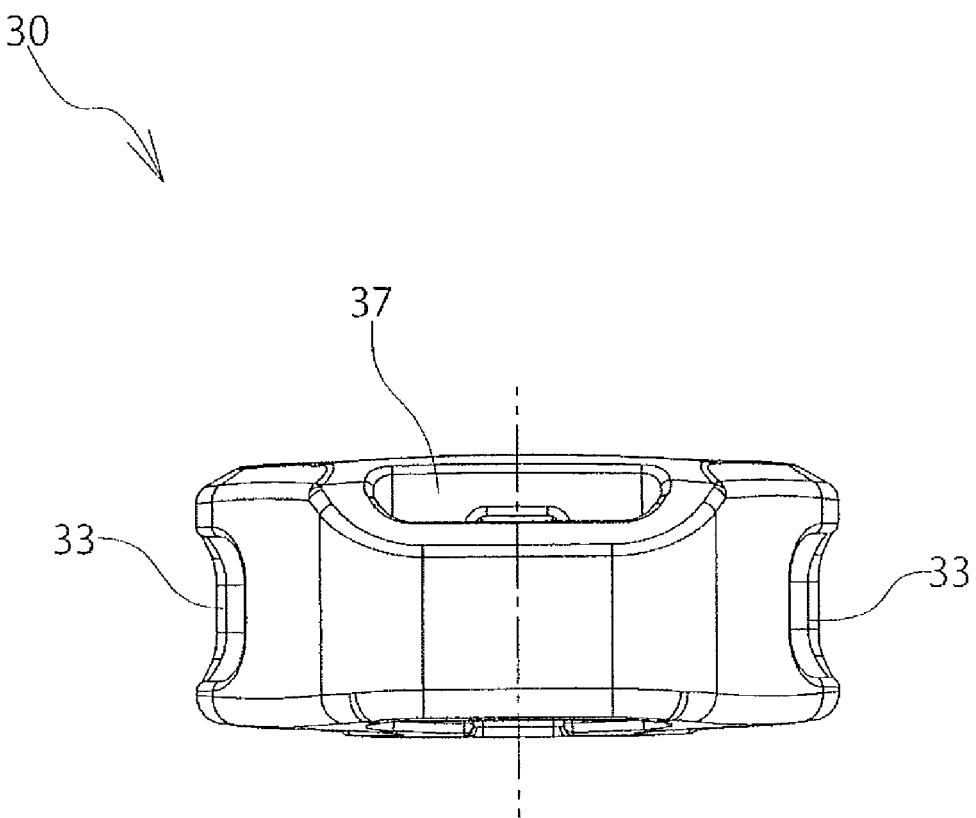
FIG. 4 is a side view of the female member.
Figure 5:
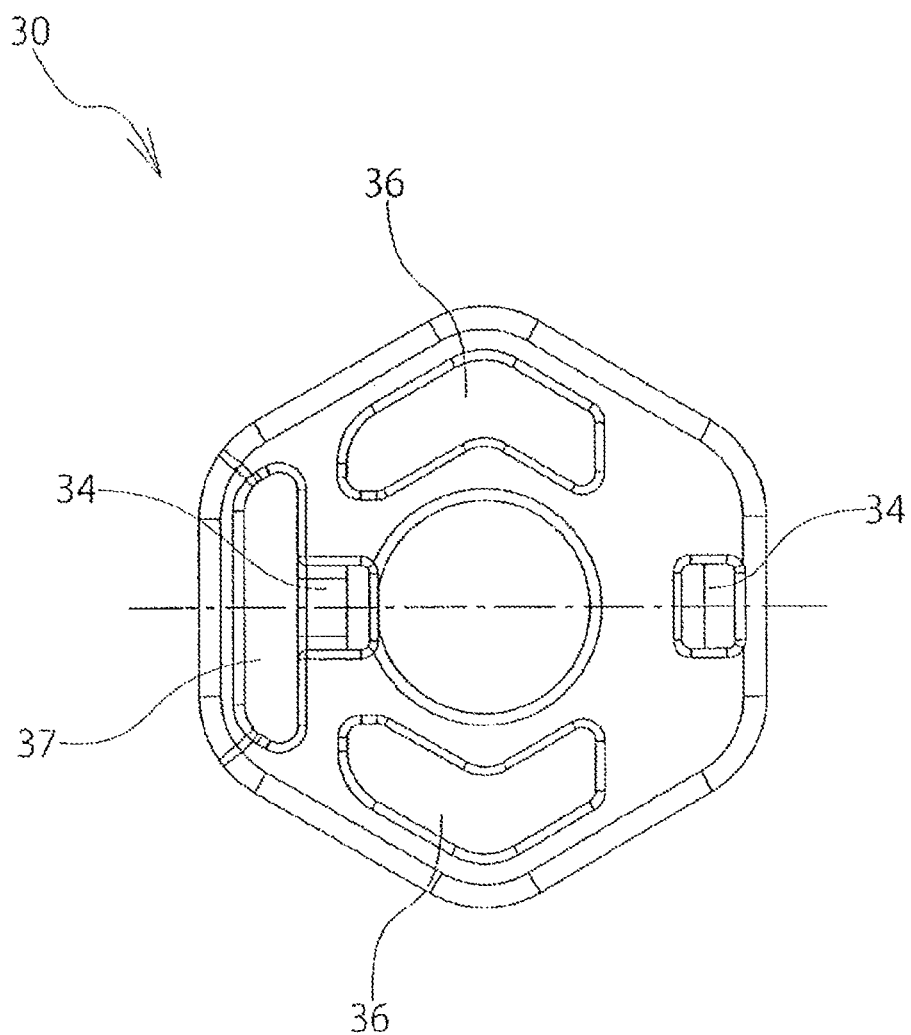
FIG. 5 is a bottom view of the female member.

As shown in FIG. 2, the whole female member 30 is formed in a regular hexagon, and formed in a cylindrical or hollow shape with a hexagon wherein one side of the regular hexagon is cut out. In the aforementioned cut-out portion, there is provided the hole portion 37 through which the belt-like material (not shown in the drawings) of the band or the like can be inserted to pass.

As shown in FIG. 2, and FIGS. 4 to 6, the hole portion 37 vertically passes, and in FIG. 2, the hole portion 37 is formed in a vertically long ellipse.

Incidentally, the hole portion 37 is formed in the ellipse; however, it is not limited to the above, and may be formed in a square shape, a circular shape, an oval shape, or the like.

Figure 6:
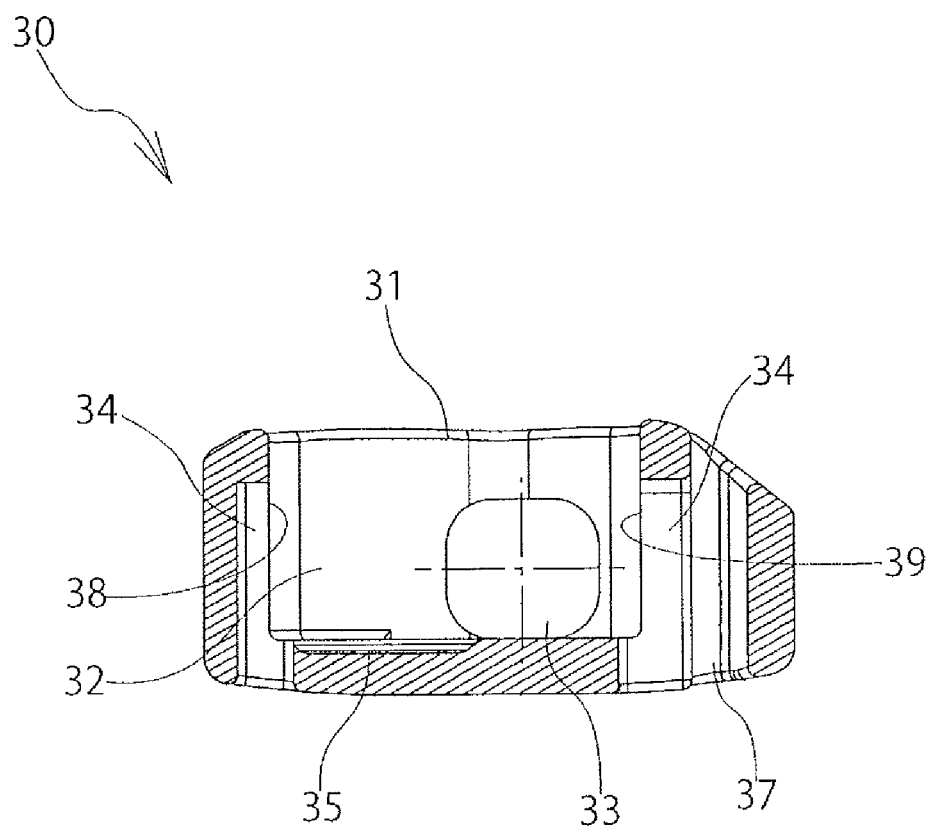
FIG. 6 is a cross-sectional view of the female member.
Figure 12:
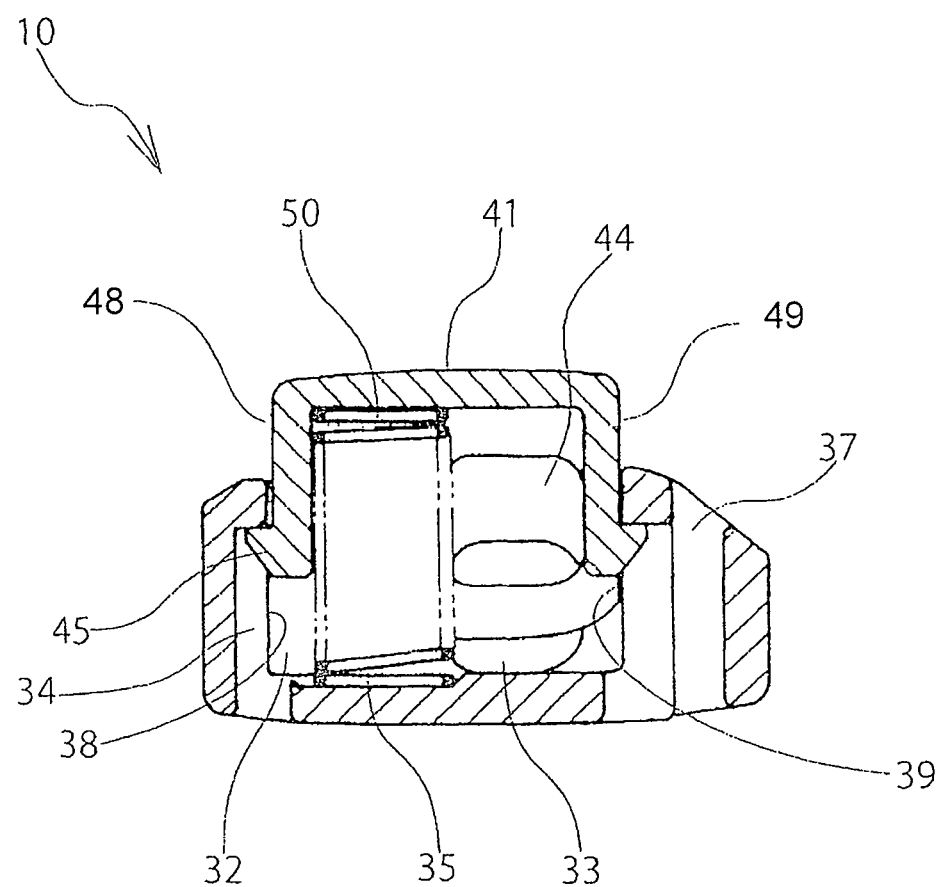
FIG. 12 is a cross-sectional view of the cord lock in an assembled state.

As shown in FIG. 6, in the female member 30, an upper face of the cylindrical shape of the hexagon is open so as to become the opening 31, and a bottom face is closed, and there is formed a hollow portion 32 internally. As shown in FIG. 1 and FIG. 12, in the hollow portion 32, the later-described male member 40 is supported to be capable of going in and out from the opening 31.

As shown in FIGS. 2 to 6, the female member 30 is provided with the following respective portions.

Incidentally, the following (1) to (5) will be described later.

(1) First Cord Insertion Portions 33
(2) Slide Grooves 34
(3) Spring Receiving Portion 35
(4) Through Portions 36
(5) Inside straight portions 38 and 39

Incidentally, each portion of the female member 30 is not limited to the aforementioned (1) to (5).

(Male Member 40)

As shown in FIG. 1, FIG. 13, and FIG. 14, the male member is supported to be capable of going in and out from the opening 31 of the female member 30, and can communicate with the first cord insertion portions 33, and includes second cord insertion portions 44 through which the cord 20 inserted to pass through the first cord insertion portions 33 can be inserted to pass.

The male member 40 is integrally formed by thermoplastic resin having elasticity in addition to appropriate rigidity, for example, the POM (polyacetal or polyoxymethylene) as with the female member 30.

Incidentally, as for a material of the male member 40, the POM has been shown as an example; however, it is not limited to the above, and another resin material may be used, or the male member 40 may be made of metal.

Figure 7:
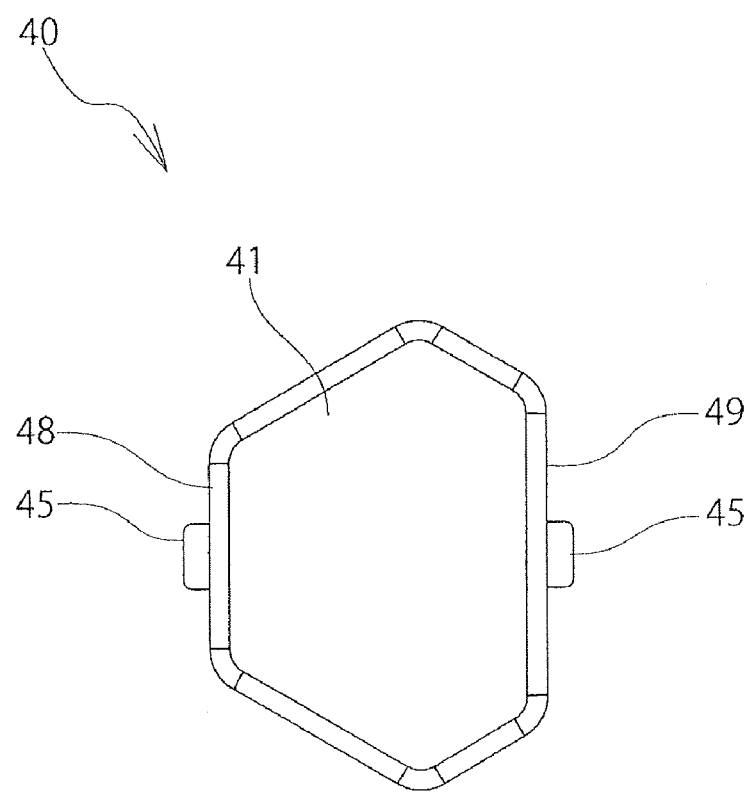
FIG. 7 is a plan view of a male member according to the first embodiment of the present invention.
Figure 8:
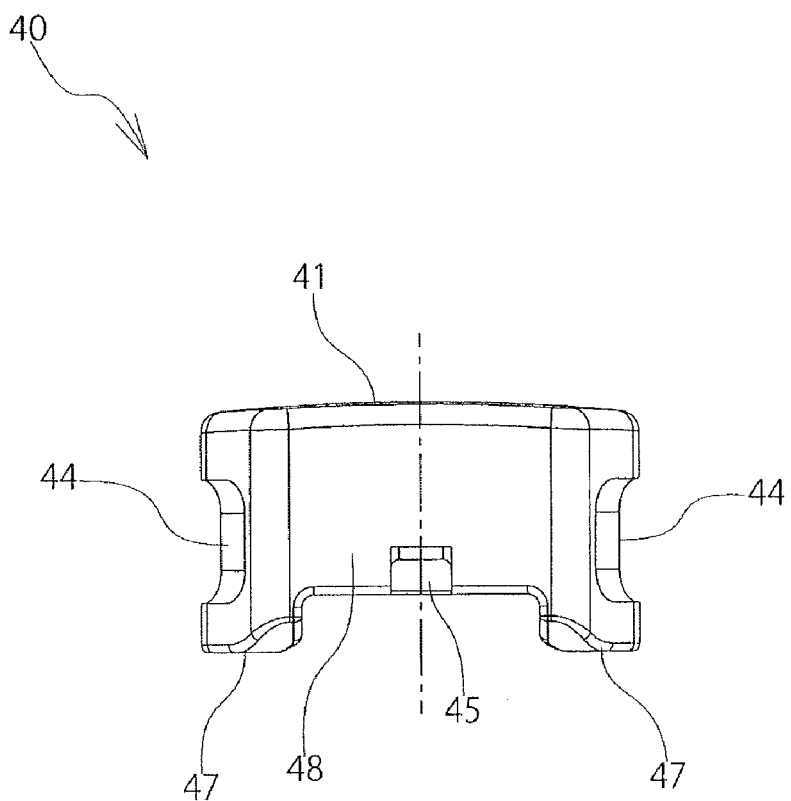
FIG. 8 is a side view of the male member.
Figure 11:
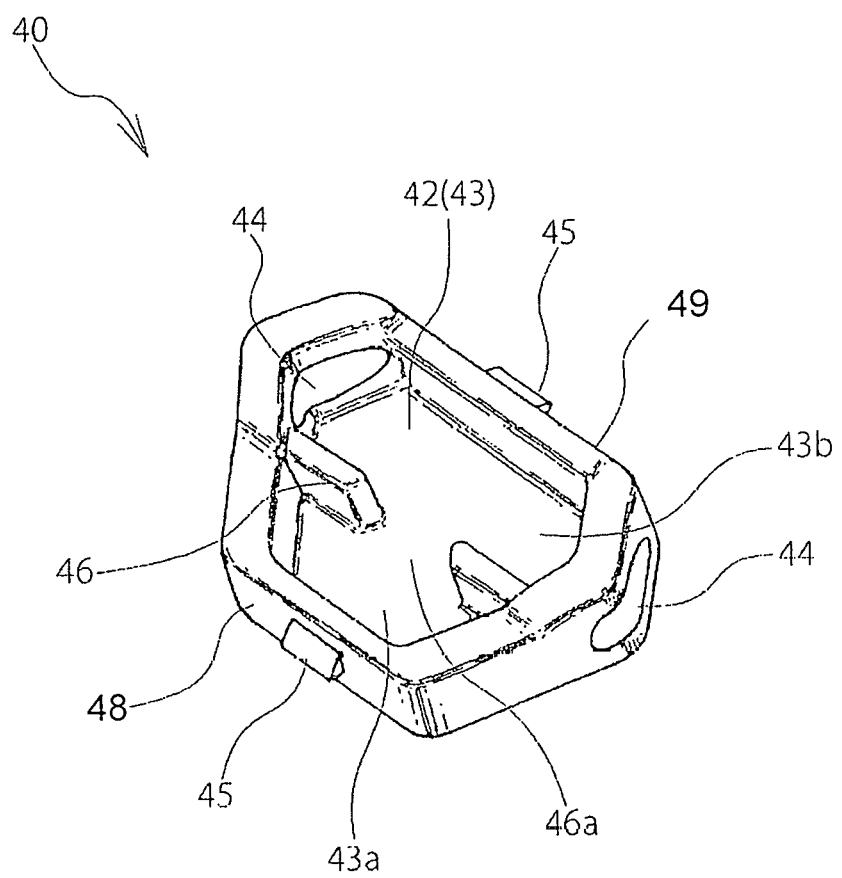
FIG. 11 is a perspective view wherein the male member is viewed from a bottom face side.

As shown in FIGS. 12 to 14, the male member 40 enters into the hollow portion 32 of the female member 30, and as shown in FIG. 7 and FIG. 11, the male member 40 has an outer shape substantially equal to a planar shape of the opening 31 of the female member 30, and is formed in a hexagonal cylindrical shape.

As shown in FIG. 12, in the male member 40, an upper face of the hexagonal cylindrical shape is closed, and becomes a pressing portion 41 when the male member 40 is pressed toward the female member 30. Also, as shown in FIG. 12, in the male member 40, a lower face of the hexagonal cylindrical shape is open, and there is internally formed a hollow portion 42.

As shown in FIGS. 7 to 11, the male member 40 is provided with the following respective portions.

Incidentally, the following (1) to (5) will be described later.

(1) Second Cord Insertion Portions 44
(2) Slide Projections 45
(3) Partition Wall 46

(4) Flange Portions 47

(5) Outside Straight Portions 48 and 49

Incidentally, each portion of the male member 40 is not limited to the aforementioned (1) to (5).

(Coil Spring 50 (Urging Device))

As shown in FIG. 1 and FIG. 12, the coil spring 50 is provided between the female member 30 and the male member 40 to provide an urging force in a direction wherein the male member 40 protrudes from the opening 31 of the female member 30, and forms the urging device.

Figure 16:
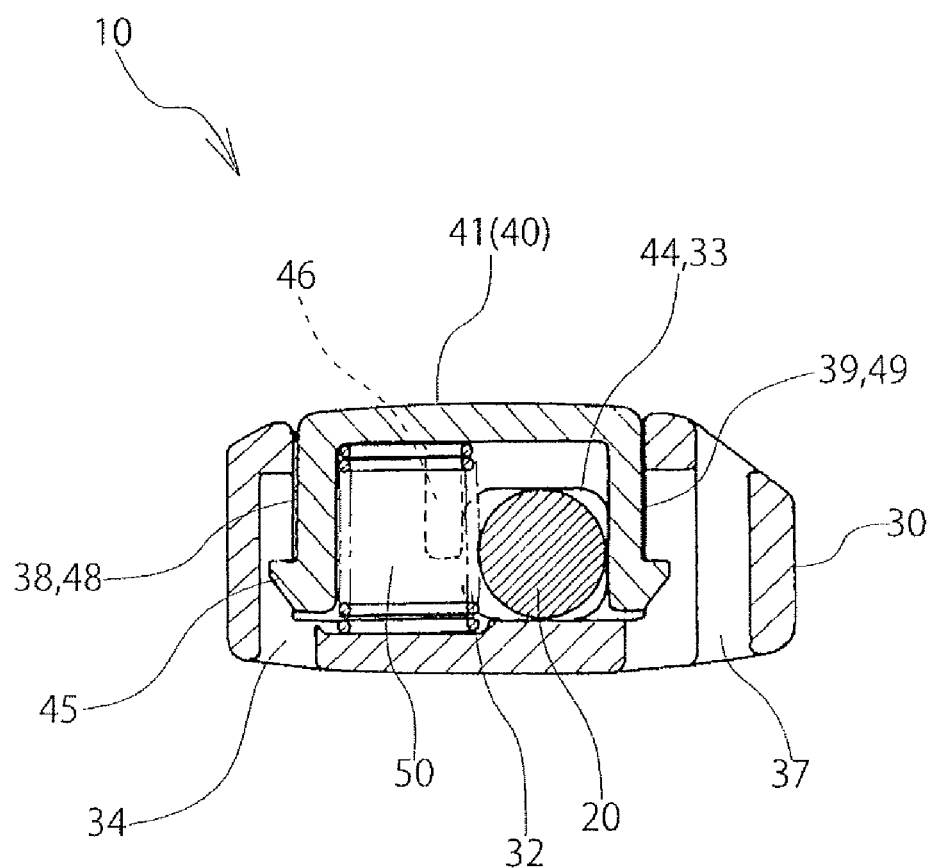
FIG. 16 is a cross-sectional view of the cord lock wherein the cord is inserted to pass through corresponding to FIG. 12.

As shown in FIG. 16, the coil spring 50 is disposed to abut against the later-described second cord insertion portion 44 of the male member 40.

As shown in FIG. 12, in the coil spring 50, one end portion enters into the later-described concaved spring receiving portion 35 of the female member 30, and the other end portion enters into the later-described spring chamber 43a of the male member 40, and the coil spring 50 is compressed by the closed bottom face of the hollow portion 32 of the female member 30, and an upper face of the closed hollow portion 32 of the male member 40.

(First Cord Insertion Portions 33 of the Female Member 30)

As shown in FIG. 1, FIG. 13, FIG. 14, and FIG. 16, the first cord insertion portions 33 can pass through the cord 20. The first cord insertion portions 33 are formed as a pair facing each other, and as shown in FIG. 1, formed in a hole shape passing through side walls, and have a square shape wherein four corners are curved in an arc shape.

Incidentally, the first cord insertion portions 33 are formed in a square hole shape; however, they are not limited to the above, and may be formed in a circular shape, an oval shape, and an ellipse other than the square shape, or they are not limited to the hole shape, and may be formed in a slit shape as well.

(Slide Grooves 34)

As shown in FIG. 12, the slide grooves 34 are formed as a pair facing each other inside the hollow portion 32, and engage the later-described slide projections 45 of the male member 40 fitted into the hollow portion 32 for supporting the male member 40 vertically movably inside the hollow portion 32. Also, the slide groove 34 extends in an up-and-down direction wherein an upper end portion is a dead end, and in a position wherein the slide projection 45 abuts against the upper end portion of the dead end, the slide groove 34 controls a most elevated position of the male member 40.

Incidentally, there are respectively formed the slide groove 34 in the female member 30, and the slide projection 45 in the male member 40; however, they are not limited to the above, and although they are not shown in the drawings, the slide projection may be formed in the female member 30, and the slide groove may be formed in the male member 40.

(Spring Receiving Portion 35)

As shown in FIG. 1 and FIG. 2, the spring receiving portion 35 is formed in a concave shape in a bottom of the hollow portion 32, wherein a flat surface is formed in a circular shape having one size larger than an outer periphery of the coil spring 50.

As shown in FIG. 12, in the spring receiving portion 35, there is fitted a lower end portion of the coil spring 50.

(Through Portions 36)

As shown in FIG. 2 and FIG. 14, the through portions 36 are formed in a penetration manner at a bottom portion facing the opening 31 of the female member 30, i.e. on a bottom wall of the hollow portion 32, and at least one portion of a peripheral wall of the male member 40, i.e. the later-described flange portions 47 can pass through.

The through portions 36 are formed as a pair on the bottom wall of the hollow portion 32 such that a flat surface forms an approximately V shape, and a pointed tip portion of the approximately V shape is disposed to face outward.

(Inside Straight Portions 38 and 39)

As shown in FIG. 1 and FIG. 13, the inside straight portions 38 and 39 extend along an insertion direction of the cord 20 inserted to pass through the first cord insertion portions 33 of the female member 30, i.e. parallel to the insertion direction; are provided on opposed faces on a female member 30 side facing opposed faces on a male member 40 side; and at least can line-contact with the later-described outside straight portions 48 and 49 on the male member 40 side.

The inside straight portions 38 and 39 are positioned on inside faces inside the hollow portion 32, and formed as a pair using two opposing sides of the hexagon. As shown in FIG. 12 and FIG. 16, the inside straight portions 38 and 39 surface-contact with the outside straight portions 48 and 49 of the male member 40 fitted into the hollow portion 32 of the female member 30.

Incidentally, the inside straight portions 38 and 39 are formed as the pair facing each other; however, they are not limited to the above, and may be one, or three or more. Also, the inside straight portions 38 and 39 surface-contact with the outside straight portions 48 and 49 of the male member 40; however, they may be provided in such a way as to carry out at least a line contact.

(Second Cord Insertion Portions 44 of the Male Member 40)

As shown in FIG. 12 and FIG. 16, the second cord insertion portions 44 can communicate with the first cord insertion portions 33 of the female member 30 in a state fitted into the hollow portion 32 of the female member 30, and the cord 20 inserted to pass through the first cord insertion portions 33 can be inserted to pass through. As shown in FIG. 11, the second cord insertion portions 44 are formed as a pair facing each other, formed in a hole shape passing through the side walls, and have a square shape wherein four corners are curved in an arc shape.

Incidentally, the second cord insertion portions 44 are formed in a square hole shape; however, they are not limited to the above, and may be formed in a circular shape, an oval shape, and an ellipse other than the square shape, or they are not limited to the hole shape, and may be formed in a slit shape as well.

(Slide Projections 45)

As shown in FIG. 12, the slide projections 45 enter into the slide grooves 34 of the female member 30 in a state wherein the male member 40 is fitted into the hollow portion 32. As shown in FIG. 1, the slide projections 45 are arranged as a pair back to back from a lower end portion to protrude outward in a claw shape.

The slide projections 45 are pushed by an opening wall of the female member 30 to elastically bend, and after passing through the opening wall, the slide projections 45 are restored, and enter into the slide grooves 34.

(Partition Wall 46)

Figure 15:
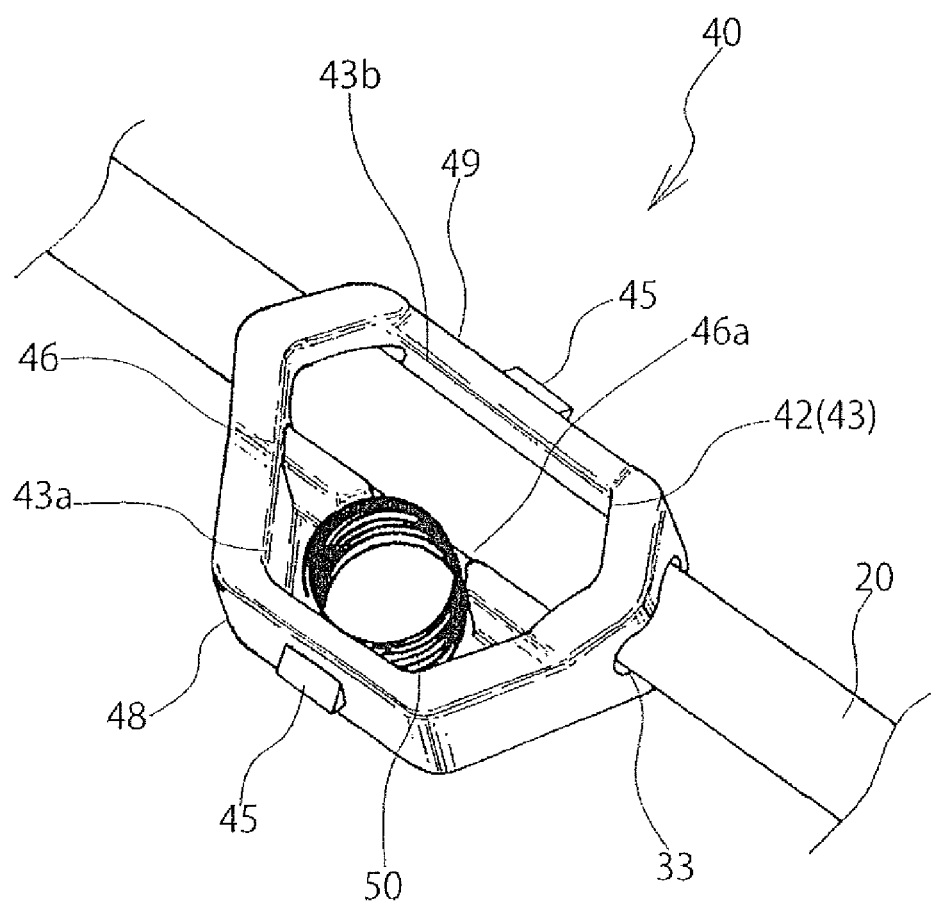
FIG. 15 is a perspective view of the male member wherein a coil spring is mounted, and the cord is inserted to pass through corresponding to FIG. 11.

As shown in FIG. 11 and FIG. 15, the partition wall 46 is positioned between the second cord insertion portions 44 and the coil spring 50, and partitions inside the hollow portion 42 of the male member 40 into a spring chamber 43a and a cord chamber 43b.

As shown in FIG. 1, the partition wall 46 extends downward from an upper face of an inside of the hollow portion 42, and a lower end portion thereof is positioned in a middle of a height of the second cord insertion portion 44, i,e. at approximately one half of the height.

As shown in FIG. 11, FIG. 12, and FIG. 15, in the partition wall 46, an area which overlaps the coil spring 50 is partially cut out, i.e. there is formed a cut-out portion 46a.

Figure 9:
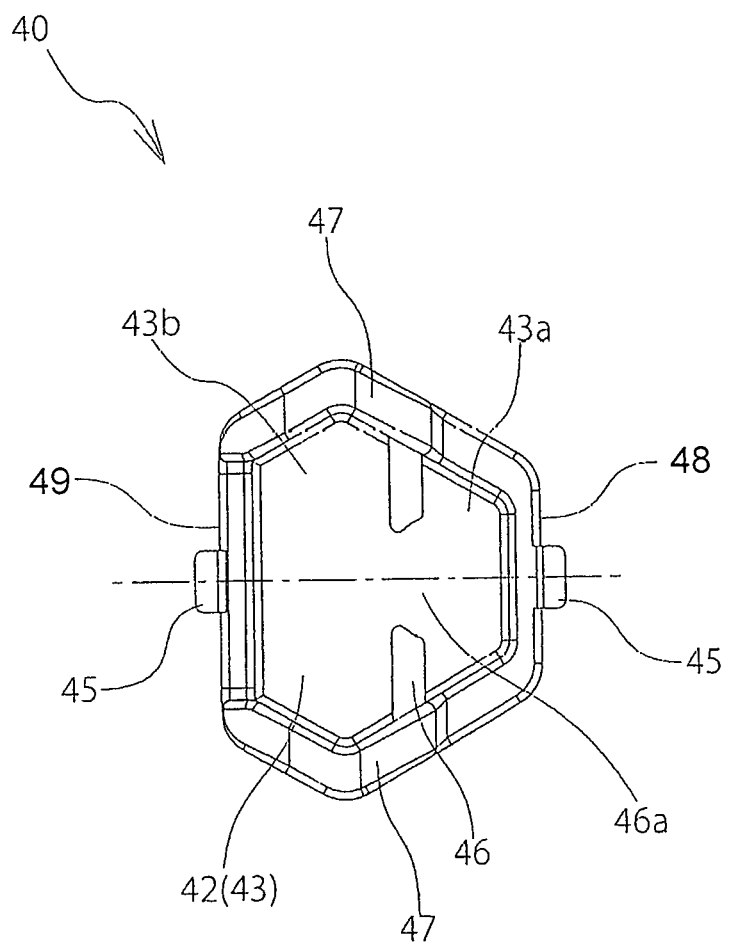
FIG. 9 is a bottom view of the male member.
Figure 10:
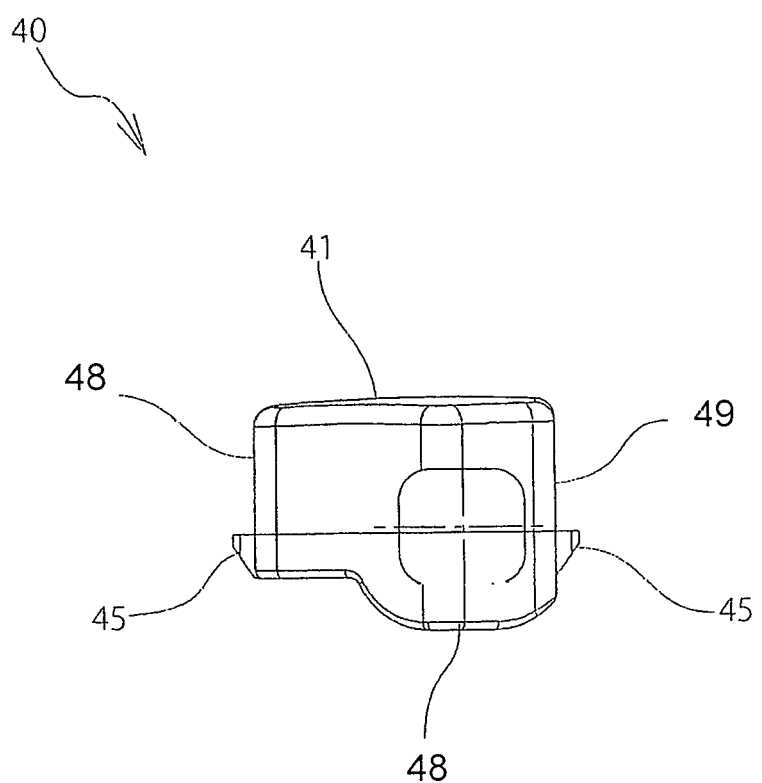
FIG. 10 is a front view of the male member.

As shown in FIG. 9, the cut-out portion 46a is positioned at an approximately center of a length of the partition wall 46, and obliquely inclines such that cross-sectional end faces of the partition wall 46 facing each other sandwich the cut-out portion 46a and conform with the outer periphery of the coil spring 50. Incidentally, the cut-out portion 46a is formed when being formed, and it does not mean that the cut-out portion 46a is cut out after the forming.

(Flange Portions 47)

As shown in FIG. 1 and FIG. 14, the flange portions 47 are positioned at least at one portion of the peripheral wall of the male member 40, and can pass through the through portions 36 of the female member 30.

The flange portions 47 are positioned as a pair on a lower side of the second cord insertion portions 44, and as shown in FIG. 9, when the flange portions 47 are viewed from a bottom face, the flange portions 47 are bent in an approximately V shape matched to the through portions 36 of the female member 30. The flange portions 47 are overlapping portions with the female member 30 in a pressing direction of the male member 40, and enter into the through portions 36 so as to reduce a thickness of the cord lock 10.

(Outside Straight Portions 48 and 49)

As shown in FIG. 1 and FIG. 13, as with the inside straight portions 38 and 39 on the female member 30 side, the outside straight portions 48 and 49 extend along the insertion direction of the cord 20 inserted to pass through the first cord insertion portions 33 of the female member 30, i.e. parallel to the insertion direction; are provided on the opposed faces on the male member 40 side facing the opposed faces on the female member 30 side; and at least can line-contact with the inside straight portions 38 and 39 on the female member 30 side.

The outside straight portions 48 and 49 are positioned on an outside face of the male member 40, and formed as a pair using two opposing sides of the hexagon. As shown in FIG. 12 and FIG. 16, the outside straight portions 48 and 49 surface-contact with the inside straight portions 38 and 39 thereof when the outside straight portions 48 and 49 are fitted into the hollow portion 32 of the female member 30.

Incidentally, the outside straight portions 48 and 49 are formed as the pair facing each other; however, they are not limited to the above, and may be provided one, or three or more. Also, the outside straight portions 48 and 49 surface-contact with the inside straight portions 38 and 39 of the female member 30; however, they may be provided in such a way as to carry out at least the line contact.

(Using Method of the Cord Lock 10)

Next, a using method of the cord lock 10 in an assembled state having the aforementioned structure will be explained.

First, the cord 20 is inserted to pass through the cord lock 10.

Namely, the pressing portion 41 of the male member 40 is pressed so as to be pushed into the hollow portion 32 of the female member 30 against the urging force of the coil spring 50. Thereby, the second cord insertion portions 44 of the male member 40 descend so as to be matched with the first cord insertion portions 33 of the female member 30. The cord 20 passes through the second cord insertion portions 44 from the first cord insertion portions 33 to enter into the hollow portion 42 of the male member 40, and furthermore, the cord 20 passes through the first cord insertion portions 33 through the second cord insertion portions 44 to be pulled out to an outside.

After that, when a force pressing the pressing portion 41 is released, due to a compression restoring force of the coil spring 50, the second cord insertion portions 44 rise, and the cord 20 is sandwiched between an upper side of the first cord insertion portion 33 and a lower side of the second cord insertion portion 44 so as to prevent the cord 20 from moving.

On the other hand, when the length of the cord 20 is adjusted, the pressing portion 41 is pressed again so as to allow the cord 20 to move in a length direction relative to the cord lock 10. After the length is adjusted, when the force pressing the pressing portion 41 is released, at the position, the cord 20 is prevented from moving in the length direction. Incidentally, obviously, the cord lock 10 may be moved in the length direction of the cord 20.

Incidentally, all contents of the specification, claims, drawings, and abstract of Japanese Patent Application No. 2014-006421 filed on Jan. 17, 2014 are cited in their entireties herein and are incorporated as a disclosure of the specification of the present invention.

What is claimed is:

1. A cord lock, comprising:
   a female member including a pair of first cord insertion portions facing each other in a first direction and adapted to receive a cord therethrough, the female member having a cylindrical shape including an opening at least at one end of the female member and a bottom portion at another end of the female member facing the opening, the bottom portion including a pair of through portions arranged on an inner side of the corresponding first cord insertion portions;
   a male member supported to enter into and out from the opening of the female member, and including
      a pair of second cord insertion portions facing each other to communicate with the first cord insertion portions and adapted to receive the cord inserted through the pair of first cord insertion portions, and
      a pair of flange portions overlapping the female member when the female and male members are assembled, and entering into the pair of through portions, respectively; and
   an urging device provided between the female member and the male member to provide an urging force in a direction wherein the male member protrudes from the opening of the female member,
   wherein the pair of second cord insertion portions of the male member and the urging device are situated adjacent to each other, and
   the female member and the male member include faces extending along the first direction and having straight portions to line contact each other.

2. The cord lock according to claim 1, wherein the male member further comprises:
   a cord chamber arranged between the pair of second cord insertion portions and adapted to receive the cord,
   a spring chamber housing the urging device, and
   a partition wall provided between the cord chamber and the spring chamber to partition the cord chamber and the spring chamber side by side in a plan view along the first direction.

3. The cord lock according to claim 2, wherein the urging device is a coil spring, and
   the partition wall is partially cut to receive the coil spring.

4. The cord lock according to claim 2, wherein the female member includes a side wall extending from the bottom portion to define the opening, and has a hexagonal shape.

5. The cord lock according claim 1, wherein the female member includes a hole portion adapted to receive a belt-shaped material.

\* \* \* \* \*